United States Patent [19]

Kurokawa

[11] Patent Number: 5,521,007
[45] Date of Patent: May 28, 1996

[54] FIBER CORD AND POWER TRANSMISSION BELT USING THE SAME

[75] Inventor: Tomomitsu Kurokawa, Kobe, Japan

[73] Assignee: Mitsuboshi Belting Ltd., Nagata, Japan

[21] Appl. No.: 922,620

[22] Filed: Jul. 30, 1992

[51] Int. Cl.⁶ .................................................. D02G 3/00
[52] U.S. Cl. .......................... 428/364; 428/365; 428/377; 428/395; 428/397; 57/204; 57/214; 57/251; 152/451; 152/527; 152/565
[58] Field of Search ..................... 428/364, 365, 428/224, 229, 261, 267, 358, 378, 395, 383; 57/251; 152/451, 527, 565; 156/96

[56] References Cited

U.S. PATENT DOCUMENTS

| | | | |
|---|---|---|---|
| 3,057,389 | 10/1962 | DuBetz et al. | 152/210 |
| 3,133,583 | 5/1964 | Dobson | 152/354 |
| 3,433,689 | 3/1969 | Marzocchi et al. | 156/96 |
| 3,570,574 | 3/1971 | Marker | 152/361 |
| 3,977,172 | 8/1976 | Kerawalla | 57/140 |
| 4,248,938 | 2/1981 | Takata et al. | 428/414 |
| 4,285,756 | 8/1981 | Elmer | 156/334 |
| 4,401,713 | 8/1983 | Takata | 428/290 |
| 4,445,560 | 5/1984 | Musy | 152/200 |
| 4,557,967 | 12/1985 | Willemsen et al. | 428/224 |
| 4,572,863 | 2/1986 | Chung | 428/250 |
| 4,680,228 | 7/1987 | Sharma | 428/378 |
| 4,762,745 | 8/1988 | Mashimo et al. | 428/252 |
| 5,151,142 | 9/1992 | Imai et al. | 152/565 |

Primary Examiner—Patrick J. Ryan
Assistant Examiner—Merrick Dixon
Attorney, Agent, or Firm—Wood, Phillips, VanSanten, Clark & Mortimer

[57] ABSTRACT

A fiber cord having a plurality of fiber filaments twisted together in a first direction to produce strand yarns with a primary twist and a first twist coefficient, with a plurality of the strand yarns being in turn aligned and twisted together in a second twist direction opposite to the first twist direction to produce a fiber cord with a final twist and a second twist coefficient. The second twist coefficient is between 4.0 and 7.0 and the ratio of the second twist coefficient to the first twist coefficient is at least 1.25.

24 Claims, 1 Drawing Sheet

FIBER CORD AND POWER TRANSMISSION BELT USING THE SAME

BACKGROUND OF THE INVENTION

1. Field of the Invention

This invention relates to power transmission belts and, more particularly, to a load-carrying cord for use in such power transmission belts, which cord has excellent tensile strength and resistance to both bending fatigue and fraying. The invention also relates to a method of making the fiber cord and a belt having the fiber cord incorporated therein.

2. Background Art

It is common to construct load-carrying cords in conventional V-belts by bundling fiber filaments and twisting a plurality of the bundled filaments to produce a cord of a desired thickness. The cord is then treated with any of a number of solutions that enhance its adherence to a rubber layer in which the cord is embedded.

It is also known to construct load-carrying cords from aramid fiber. Aramid fiber is desirable because of its strength, flexibility, and dimensional stability, even in high temperature environments. However, when the aramid fiber cords are treated with a solution to enhance their adherence to rubber, the solution penetrates the fibers and adversely affects the resistance of the cords to bending fatigue.

Another problem with cords made from aramid fiber is that they are prone to fraying. It is common in power transmission belts for the load-carrying cords to be exposed at one or both laterally oppositely facing side surfaces of the belt. This situation is common in toothed belts, V-ribbed belts, V-belts, etc. having exposed rubber sides surfaces that are not covered, as by fabric. These belts are commonly referred to in the industry as "raw edge belts".

Various solutions to the above problems have been attempted. In addition to addressing the above problems, belt designers have striven to maximize the tensile strength of the load-carrying cords.

It is known that the twist of the cord filaments affects the bending fatigue resistance for the cord. In Japanese Patent Laid Open Publication No. Sho 56-105,135, a specific range of twist coefficients is set forth to improve bending fatigue resistance.

An alternative proposed solution to the diminishing of bending fatigue resistance, by controlling twist, is disclosed in Japanese Patent Laid Open Publication No. Hei 2-42230. An improvement in bending fatigue resistance is disclosed by defining the cords using yarns with opposite primary and final twist directions. The final twist coefficient is described to be in the range of 3.5 to 5.7, with the catenary being no more than 0.8.

Generally, if the number of twists per unit length is increased, bending fatigue resistance for the fiber cord is improved. However, this is achieved at the expense of the tensile strength of the cord. As the number of twists per unit length is increased, the inclination of the fiber length to the length of the load-carrying cord is increased and, resultingly, the component of tensile force applied lengthwise of the fiber is decreased. Further, the alignment of the cord in a belt may be adversely affected when a large number of twists are used in defining the cords.

By modifying the cord twist to enhance bending fatigue resistance, the belt may also become more prone to fraying. Decreasing the number of twists per unit length increases the length of the fiber exposed at the side surfaces of the belt. During cutting of the belt, the cutter tends to fray the exposed cords. Cord fraying may be aggravated by pulleys cooperating with the belt in use, which may ultimately cause the cords to dislodge from the belt body. Various solutions have been proposed to this fraying problem.

One attempted solution to the fraying problem has been to treat the cords with a resorcin-formalin-rubber latex adhesive solution (RFL solution). Another proposed solution has been to pretreat the cords with epoxy or isocyanate compound and then use the above RFL adhering solution.

In the case of treatment with an RFL solution alone, bending resistance is improved, however, the problem of fraying remains. Pretreatment with the epoxy or isocyanate compound hardens the cords to reduce their propensity to fray. However, this pretreatment results in the deterioration of the bending fatigue resistance. Consequently, neither of the above proposed solutions satisfactorily addresses the problem of fraying while maintaining the desired bending characteristics of the cord.

Another improvement in load-carrying cords, focused on maximizing the tensile strength for load-carrying cords and reducing bending fatigue resistance and fraying, is disclosed in Japanese Patent Application No. Hei 3-133,419, owned by the assignee of the instant invention. Individual strands of untwisted aramid filaments, in a ribbon state and having a denier of 300–3100 d, are twisted with a primary twist. At least two such filaments are twisted and adhered, by epoxy resin, into bundles. The bundles are then twisted together with a final twist. The bundles can then be either a) adhered with rubber paste or b) treated additionally with an RFL solution prior to adherence with the rubber paste. The final twist coefficient is disclosed as being within the range of 1–4, with the primary twist coefficient being in the range of −1 to 1. The relationship between the final twist coefficient (X) and the primary twist coefficient (Y) is $Y \geq -6.0X+1.3$ Y is $\leq -1.5X+5.0$. This prior work was carried out by the assignee of this invention. The objective was to improve bending fatigue resistance, maximize tensile strength, and reduce fraying by a combination of controlling the cord twist and using an adhesive.

Another relevant disclosure is found in Japanese Patent Laid Open Publication No. Hei 2-42230. The final twist coefficient is characterized as being at least 5.0. If the primary twist coefficient is increased, the tensile strength of the cord is reduced, even if the ratio of the coefficients were to be 1.25 or less. There is still a substantial range of twist coefficients in which fraying is not adequately prevented by the prior art cords.

SUMMARY OF THE INVENTION

The present invention is specifically directed to overcoming the above-enumerated problems in a novel and simple manner. More particularly, it is the principal objective of the present invention to provide a fiber cord which has excellent tensile strength and resistance to bending fatigue and fraying so as to impart these same properties to a belt into which the cord is incorporated.

More particularly, the invention comprehends a fiber cord having a plurality of fiber filaments/strands twisted together in a first direction to produce strand yarns with a primary twist and a first twist coefficient, with a plurality of the strand yarns being in turn aligned and twisted together in a second twist direction opposite to the first twist direction to produce a fiber cord with a final twist and a second twist coefficient. The second twist coefficient is between 4.0 and 7.0 and the ratio of the second twist coefficient to the first twist coefficient is at least 1.25.

In a preferred form, the fiber filaments are aramid fiber filaments. Aramid fiber generally affords good resistance to bending fatigue.

In one form, the fiber filaments are pretreated with an epoxy compound. This enhances the bundling properties of the filaments, which are normally in an untwisted, ribbon-like state. This pretreatment also reduces fraying without significantly reducing the tensile strength of the cord and the bending fatigue resistance thereof.

With the primary and final twists in the above range, the specified final twist improves bending fatigue resistance and minimizes fraying while the specified primary twist number assures that the tensile strength of the cord is maintained.

With the inventive cord incorporated into a power transmission belt, as a load-carrying element, the transmission belt realizes the advantages of a long life, excellent durability, and excellent performance.

In one form, the fiber is treated with an RFL solution.

In a preferred form, the total denier for the fiber cord is 3,000–30,000 d. A preferred denier is approximately 18,000 d.

The present invention contemplates the combination of the fiber cord with a belt body having a length, with the fiber cord extending lengthwise of the belt body.

In one form, the belt body has oppositely facing side surfaces and the fiber cord is exposed at at least one of the side surfaces of the belt body.

The belt body may define a cogged belt, a V-ribbed belt, a V-belt, or the like.

In one form, the fiber cord is embedded in a rubber layer that is at least one of natural rubber, styrene butadiene rubber, chloroprene rubber, and nitrile rubber.

In one form, there are short staple reinforcing fibers in the rubber layer that are at least one of cotton, pulp, nylon, polyester, aramid, artificial silk, rayon, and carbon fiber. The reinforcing fibers are preferably mixed in the ratio of 1 to 20 weight parts of reinforcing fiber per 100 weight parts of rubber.

In one form, a plurality of a second type of laterally extending cords are embedded in the belt body, with these cords being made from at least one of polyester, aliphatic polyamide, aromatic polyamide, glass fiber, and carbon fiber. These laterally extending cords can be provided in the compression and/or tension section of the belt.

In one form, the belt is a cogged belt having a compression section defining longitudinally spaced cogs with valleys therebetween. A plurality of laterally extending cords are provided in the compression section and follow a wave-like pattern.

In one form, the belt body has an inside surface and an outside surface and the laterally extending cords are spaced from the inside of the fiber cord a distance that is in the range of 0.05 to 0.8 times the distance between the valley and the inside of the fiber cord.

In one form, there is a reinforcing rubber layer between the laterally extending cords and the fiber cord, with the reinforcing rubber layer having a thickness in the range of 0.2 to 5.0 mm.

In one form, the belt has an inside surface and an outside surface and there is at least one layer of fabric on at least one of the inside and outside surfaces.

In one form, the fiber filaments have a denier of approximately 1,500 d each, with at least three filaments being in each strand yarn. There are four such strand yarns in the fiber cord.

The present invention also comprehends a method of forming a fiber cord for use in a power transmission belt, which method includes the steps of treating a plurality of untwisted filaments with an epoxy compound, twisting a bundle of the untwisted filaments together in a first direction to produce strand yarns with a primary twist and a first twist coefficient, and twisting a plurality of the strand yarns together in a second twist direction opposite to the first twist direction to produce a fiber cord with a final twist and a second twist coefficient that is between 4.0 and 7.0. The ratio of the second twist coefficient to the first twist coefficient is at least 1.25.

The invention also contemplates the step of incorporating the fiber cord into a rubber portion of a power transmission belt body. The cords can be treated to enhance their ability to adhere to the rubber.

DETAILED DESCRIPTION OF THE DRAWINGS

Figure 1:
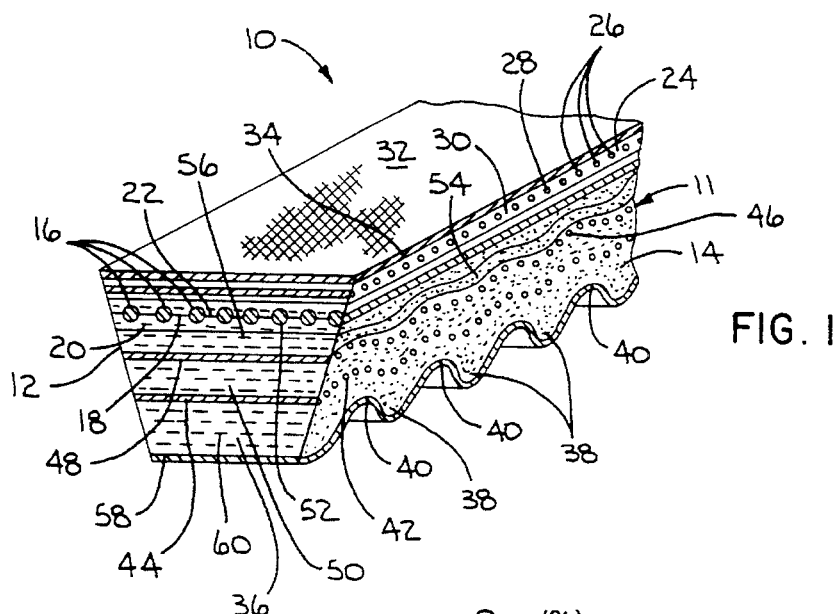
FIG. 1 is a perspective view of a section of a cogged power transmission belt according to the present invention.

In FIG. 1, a cogged V-belt is shown at 10, made according to the present invention. The belt 10 has a body 11 with oppositely facing side surfaces 12, 14 which are not covered by any fabric layer and therefore directly contact a pulley (not shown) with which the belt 10 cooperates. This type of belt is referred to in the industry as a "raw edge" belt.

It should be understood that the present invention can be incorporated into all different types of power transmission belts, i.e. V-ribbed belts, toothed belts, V-belts, etc. However, it is particularly adaptable to a raw edge cogged V-belt, as shown at 10 in FIG. 1. Accordingly, the description herein will be limited to the application of the present invention to the cogged V-belt 10, to which the present invention is particularly adaptable. It should also be understood that the invention can be incorporated into a belt that is not a "raw edge" belt.

The present invention is specifically directed to load-carrying cords 16, which define the neutral belt axis. The cords 16 extend lengthwise of the belt 10 with turns of the cord 16 spaced laterally thereof. The load-carrying cords 16 are embedded in an adhesive rubber layer 18 that is made from either one, or a combination, of natural rubber (NR), styrene butadiene rubber (SBR), chloroprene rubber (CR), nitrile rubber (NBR), and the like.

Short, staple, reinforcing fibers 20 are embedded in the adhesive rubber layer 18 and extend substantially in a lateral direction. The fibers 20 have an aspect ratio of 50 to 2000 and are preferably made of one, or a combination, of a) natural fiber such as cotton and pulp, b) synthetic fiber such as nylon, polyester and aramid, c) reclaimed fibrous material such as artificial silk and rayon, and d) inorganic fiber such as carbon fiber. The fibers 20 are mixed with the rubber in the adhesive rubber layer 18 in a ratio of 1 to 25 weight parts of fiber 20 to 100 weight parts of rubber.

The load-carrying cords 16 are conventionally made from materials that resist elongation and provide high tensile strength. Typically, the load-carrying cords 16 are made from one of polyester, aliphatic polyamide, aromatic polyamide (sold commercially under the trade name KEVLAR), and glass fiber. The load-carrying cords 16 extend longitudinally of the belt 10 and cooperatively form a tensile cord layer 22, which defines the neutral belt axis. As described in greater detail below, the present invention contemplates the use of aramid fiber to manufacture the load-carrying cords 16.

In the belt tension section 24, outside of the adhesive rubber layer 18, are a plurality of a second type of laterally extending cords 26. The cords 26 extend fully between the belt side surfaces 12, 14 and are arranged in close parallel relationship to cooperatively define a screen-like sheet/layer 28 that is part of an expansion layer 30. The cords 26 are preferably made from one of polyester, aliphatic polyamide, aromatic polyamide, glass fiber and carbon fiber.

A fabric layer 32 is adhered to the outer surface 34 of the expansion layer 30. One to three such layers 32 may be provided on the outside of the belt 10. The fabric layers 32 preferably are each rubber-coated bias fabric or rubber-coated wide angle fabric made of woven warp and weft cotton yarns or rubber-coated expansion/compression fabric woven by wooly processed crimped nylon warp yarns and normal nylon weft yarns.

The rubber in the compression section 36, which is located inside of the tensile cord layer 22, is shaped to define a plurality of curved cogs/teeth 38 with a valley 40 being defined between adjacent cogs/teeth 38. The cogs/teeth 38 have a predetermined pitch.

Within the compression section 36, at least one screen-like cord sheet/layer 42 is provided and made up of individual, laterally extending cords 44 such as the cords 26 in the sheet 28. A second screen-like sheet/layer 46 is provided outside of the screen-like layer 42. The cords 48 making up the layer 46 and the cords 44 making up the layer 42 are preferably made from the same material as the cords 26 in the layer 28. The layers 42, 46 are spaced from each other and arranged in a similar wave-like pattern generally following the contour of the cogs/teeth 38. The cords 44, 48, like the cords 26, extend laterally the full width of the belt 10 to be exposed at the belt side surfaces 12, 14. An intermediate rubber layer 50 is provided between the layers 42, 46.

The cords 44, 48 are spaced from the inside edges 52 of the load-carrying cords 16 by a distance in the range of 0.05 to 0.8 W, where W is the distance from the inside edges 52 of the load-carrying cords 16 to the valley 40 between adjacent cogs/teeth 38. In other types of non-cogged belts, the distance W is measured from the inside surface of the belt.

A reinforcing rubber layer 54 is located between the tensile cord layer 22 and the cord layer 46. Short, staple, reinforcing fibers 56 are embedded in the rubber layer 54 to extend laterally of the belt 10. The fibers 56 are preferably made from the same rubber material as the reinforcing fibers 20 in the adhesive rubber layer 18. The fibers 56 have an aspect ratio of 50 to 2000 and are present in the amount of 5 to 35 weight parts of fiber to 100 weight parts of rubber. In any event, the concentration of fibers 56 in the rubber layer 54 is greater than the concentration of the fibers 20 in the adhesive rubber layer 22. In a preferred form, the thickness of the reinforcing rubber layer 54 is between 0.2 and 5.0 mm.

If the cords 44, 48 are spaced less than 0.05 W from the inside edges 52 of the load-carrying cords 16, the thickness of the reinforcing rubber layer 54 is reduced excessively. A peeling phenomenon in the boundary between the tensile cord layer 22 and the cords 44, 48 cannot be effectively prevented with this spacing. If the spacing is greater than 0.8 W, the cords 44, 48 reside too close to the inside surface 58 of the belt 10 defined by the cogs/teeth 38. The result is that the flexibility of the belt 10 is diminished so that the compression section 36 of the belt 10 is prone to cracking at the thinnest belt portion over the valleys 40 between adjacent cogs/teeth 38. Once a crack starts, it readily propagates since the cords 44, 48, which are aligned laterally of the belt 10, afford no resistance to the propagation of the crack in a lateral direction.

In a preferred form, the rubber in that portion of the compression section 36 that defines the cogs/teeth 38 is the same as the rubber in the reinforcing rubber layer 54. Short, staple, reinforcing fibers 60 are provided in the rubber in the compression section 36 in an amount that is 0 to 30% greater than the amount of fibers 56 in the reinforcing rubber layer 54. The fibers 60, which are laterally oriented, are preferably made from the same material as the fibers 56 in the reinforcing rubber layer 54 and the fibers 20 in the adhesive rubber layer 18.

The present invention is primarily concerned with the constitution and formation of the load-carrying cords 16. The cords 16 are formed by using aramid fiber filaments normally in an untwisted, ribbon state. The individual filaments/strands are pretreated, as with an epoxy compound, and twisted together into a bundle with a primary twist in a first direction. A plurality of the resulting strand yarns are then aligned and twisted oppositely to the direction of twisting of the individual filaments to produce a final twist. Each cord 16 is made up of the twisted bundles that are preferably treated with an RFL solution, preferably after carrying out the final twisting. In a preferred form, the strand yarns are twisted with a final twist coefficient of 4.0 to 7.0 and the primary and final twists are such that the ratio of the final twist coefficient to the primary twist coefficient is at least 1.25.

If the primary twist is excessive, a loss in tensile strength for the cord 16 results. Consequently, it is desirable to minimize the primary twist coefficient.

The pretreatment with epoxy resin and subsequent RFL treatment have been preformed in the past by the assignee of the present invention, as described in the background portion herein.

To improve bending fatigue resistance and minimize fraying, it is desirable to provide a range of relatively high twist coefficients for the final twist. The preferred range, as previously described for the twist coefficient, is 4.0 to 7.0.

It is preferred that the ratio of the final and primary twist coefficient be at least 1.25. If the ratio is less than 1.25, i.e. when the primary twist is increased to be within the 4.0 to 7.0 range, a decrease in the tensile strength of the cords 16 results.

The relationship between the twist coefficient to the twist is obtained by the following equation:

$$K = T \times 0.0348 \times \sqrt{D}.$$

In this equation, K is the twist coefficient, T is the number of twists per one centimeter, and D is the number of total denier for the cord.

Figure 5:
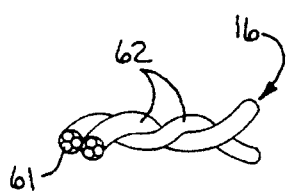
FIG. 5 is a perspective view of a portion of a load-carrying cord according to the present invention.

In a preferred form, the total denier for the cords 16 is in a range of 3,000 to 30,000 d. As a general rule, a denier of 18,000 d is preferable. In one preferred form, three bundles of 1500 d filaments 61 (FIG. 5) are gathered and twisted to produce yarn bundles 62 having a primary twist. Four of the yarn bundles 62 (two shown in FIG. 5) are gathered and twisted oppositely to the direction of twisting of the filaments 61 to produce the final twist for the cords 16.

The reason why the ratio of the final twist coefficient to the primary twist coefficient is at least 1.25, with the final twist coefficient in the range of 4.0 to 7.0, can be explained most clearly through the results of experimentation.

TESTING FOR BENDING FATIGUE RESISTANCE

Aramid fiber cords having 18,000 total denier were tested with primary and final twist coefficients and treatment as described below. The test cords were incorporated into a flat belt for testing

| Test Belt | | |
|---|---|---|
| (a) | Conventional treatment (RFL) | |
| | final twist coefficient: | 3.0 |
| | primary twist coefficient: | 3.0 |
| (b) | Conventional treatment (RFL) | |
| | final twist coefficient: | 6.0 |
| | primary twist coefficient: | 3.0 |
| (c) | Treatment according to the present invention (epoxy pretreatment and RFL) | |
| | final twist coefficient: | 6.0 |
| | primary twist coefficient: | 3.0 |

Figure 3:
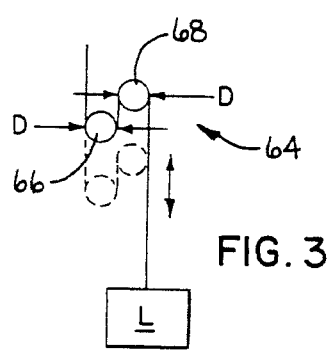
FIG. 3 is a schematic representation of a test setup for producing the data plotted in FIG. 2.

The bending characteristics of the belts were evaluated on a test setup as shown schematically at 64 in FIG. 3. The test setup 64 had two vertically spaced, flat pulleys 66, 68, each having a diameter (D) of 10 mm. The belt 10 was wrapped around the pulleys 66, 68 in an S shape. The pulleys 66, 68 were rotated at 100 RPM under a load (L) of two kilograms.

Figure 2:
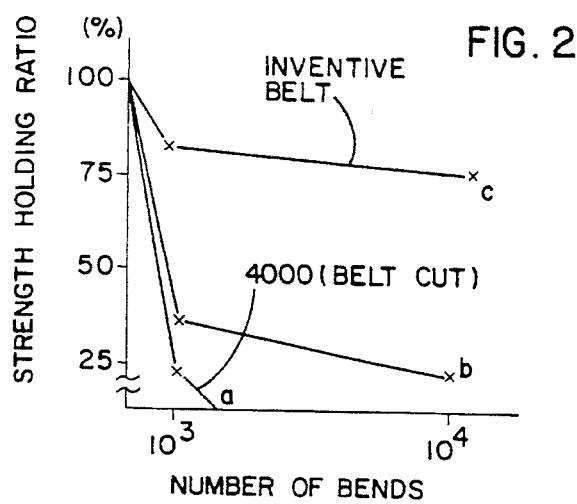
FIG. 2 is a graph showing bending number versus strength holding ratio for different belts.

The results from the bending fatigue test are graphed in FIG. 2, which plots the number of bends versus the strength holding ratio. From FIG. 2, it can be seen that the belt (c) incorporating the load-carrying cord 16, made according to the present invention, has superior bending characteristics compared to two conventional test belts (a) and (b).

TENSILE STRENGTH TESTING

Various belts were tested, both inventive and conventional, with the tensile strength being evaluated relative to a tensile strength index of 1.0 for a belt having twisted load-carrying cords with primary and final twist coefficients of 3.0. The results of this test are shown in FIG. 4 and listed in Table 1.

TABLE 1

| Treatment of cord | | Twist coefficient | | Ratio of final to primary twist coefficients | Tensile strength index | Bending fatigue test tensile strength holding ratio (%) | |
|---|---|---|---|---|---|---|---|
| | | Final twist coefficient | Primary twist coefficient | | | After 1000 times | After 10,000 times |
| Adhering | (a) | 3.6 | 3.0 | 1.00 | 1.0 | 20 | rip off |
| | (b) | 6.0 | 3.0 | 2.00 | 0.75 | 35 | 25 |
| Pretreatment and adhering | | 3.0 | 2.0 | 1.50 | 1.60 | — | 42 |
| | | 3.0 | 3.0 | 1.00 | 1.50 | — | 43 |
| | | 4.0 | 3.0 | 1.33 | 1.45 | — | 60 (present invention) |
| | | 5.0 | 3.0 | 1.67 | 1.40 | — | 68 (present invention) |
| | | 5.0 | 4.0 | 1.25 | 1.37 | — | 71 (present invention) |
| | (c) | 6.0 | 3.0 | 2.00 | 1.31 | 82 | 75 (present invention) |
| | | 6.0 | 5.0 | 1.20 | 1.15 | — | 78 |
| | | 6.0 | 6.0 | 1.00 | 1.08 | — | 80 |

Figure 4:
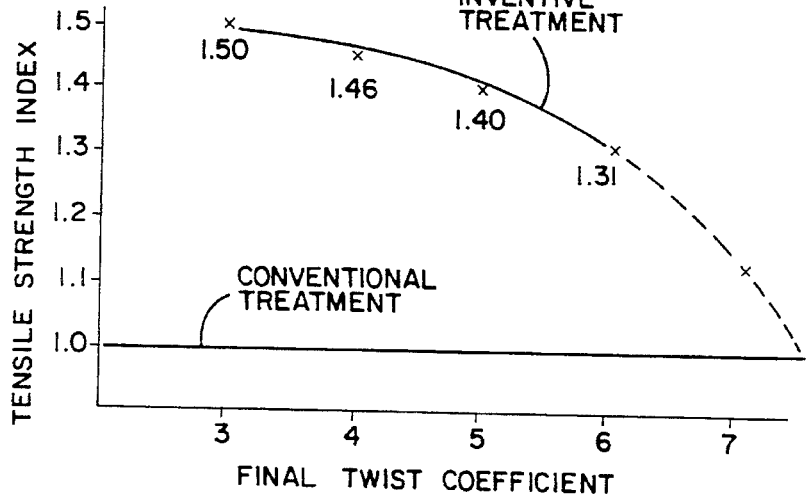
FIG. 4 is a graph showing the relationship of the final twist coefficient versus the tensile strength index for different belts.

The following four things can be observed from the test results in Table 1 and FIG. 4. 1) When the final twist coefficient is at least 4, the bending fatigue resistance of the cord is improved. 2) When both the primary and final twist coefficients are increased, the bending fatigue resistance of the cord is improved, however the contribution to the improved bending fatigue resistance by the primary twist is less than that of the final twist. 3) When the primary twist coefficient is increased, the tensile strength of the cord is decreased. 4) When the primary twist coefficient is increased, where the final twist coefficient is large, the tensile strength of the cord is reduced.

When the final twist coefficient was changed with a cord that had pretreated filaments and adhering treatment, according to the present invention, with the primary twist of 3.0, it was found that increasing the final twist coefficient above 7.0 reduces the tensile strength.

FRAYING TESTING

To observe the fraying characteristics of the load-carrying cords, cords made according to the present invention were compared with cords treated according to the prior art.

INVENTIVE TEST CORD

The inventive test cord was formed by bundling three aramid fiber filaments each having a 1,500 denier. Before the filaments were twisted, they were bundled and dipped in pretreatment solution containing 4 weight parts of epoxy resin (commercially available through Shell Chemical Co., Ltd. under the trademark Epicoat 828), one weight part of DMP-30 (2,4,6-trisdimethylaminomethylphenol), 95 weight parts of toluene, heat treated at 200° C. for one minute and then twisted in one direction with a primary twist to produce individual yarn bundles. Four such yarn bundles were then gathered and twisted reversely to the direction of twist of the individual filaments to produce a final twist.

The resulting cord was dipped in RFL adhering solution having a composition as shown in Table 2 below, and then heat treated at 200° C. for two minutes.

TABLE 2

| Mixing Chemicals | Contents (pHR) |
| --- | --- |
| CR latex | 100 |
| resorcin | 14.6 |
| formalin | 9.2 |
| caustic soda | 1.5 |
| water | 262.5 |
| Total | 387.5 |

CONVENTIONAL TEST CORD

A conventional comparison sample cord was made using three aramid fiber filaments, each of 1500 d. The untwisted aramid fiber filaments were bundled and twisted with a primary twist in a first direction without pretreatment, to produce a strand yarn. A plurality of the strand yarns were gathered and twisted together oppositely to the first direction to produce a final twist and were then treated with an RFL adhering solution.

Raw edged cogged V-belts were then formed using the inventive and conventional cords. The external appearance of the belt was then evaluated.

Ten visual evaluations were averaged to develop each input value. A standard sample was made with both final and primary twist coefficients equal to 3.0, by a conventional treatment method. The fraying of the standard sample was quantified as 1.0, with no fraying quantified as 5.0. The results of the test are shown in Table 3.

TABLE 3

| | Twist Coefficient | | | |
| --- | --- | --- | --- | --- |
| Treatment Method | Final Twist Coefficient (F) | Primary Twist Coefficient (P) | Ratio F/P | Evaluation of External Appearance of Belt |
| Conventional Treatment Method | 3.0 | 3.0 | 1.0 | 1 |
| | 6.0 | 3.0 | 2.0 | 4.2 |
| Treatment Method According to the Present Invention | 4.0 | 3.0 | 1.33 | 3.1 (present invention) |
| | 4.0 | 4.0 | 1.0 | 3.8 |
| | 5.0 | 3.0 | 1.67 | 3.8 (present invention) |
| | 5.0 | 4.0 | 1.25 | 4.0 (present invention) |
| | 6.0 | 3.0 | 2.00 | 4.5 |
| | 6.0 | 4.0 | 1.50 | 4.5 (present invention) |
| | 6.0 | 6.0 | 1.00 | 4.5 (present invention) |

From Table 3, it can be seen that the best results were obtained with the final twist coefficient in the range of 4.0 to 7.0. The primary twist coefficient does not contribute considerably to improvement in the external appearance of the belt.

Through extensive testing and evaluation it was determined that the cord of the present invention is most effective with the aramid fiber filaments pretreated in an untwisted filament state, then twisted and treated with an adhering solution. A total denier of 3,000–30,000 d is preferred. Opposite final and primary twist directions are also preferred with the final twist coefficient being between 4.0 and 7.0 and the ratio of the final twist coefficient to the primary twist coefficient being at least 1.25.

BENDING FATIGUE TESTING

The aramid fiber cords, according to the present invention, were incorporated into a power transmission belt body to act as load-carrying cords. The bending fatigue resistance for the inventive belt was compared to a conventional belt.

THE INVENTIVE BELT

The inventive belt employed load-carrying cords having a total denier of 18,000 d with a final twist coefficient of 6.0 and a primary twist coefficient of 3.0.

COMPARISON BELT

An aramid fiber cord was used treated only by conventional RFL adhering with a total denier of 18,000 d and primary and final twist coefficients of 3.0. Both the inventive and comparison belts were "B" type 40 inch cogged belts, with the only difference between the inventive and comparison belts being in the load-carrying cords.

The tests were conducted by training the belts around a drive pulley having a 50 mm diameter and a driven pulley of a 171 mm diameter. The drive pulley was rotated at 1,800 rpm. A load of 5 ps was applied to the driven pulley. The atmospheric temperature was maintained at 70° C. The tension on the belts was applied and released. Data was accumulated to ascertain the time when a defective state developed. The results of this test are shown in Table 4.

TABLE 4

| | Time to Defective State |
| --- | --- |
| Conventional Belt | Cut at 200 hours |
| Inventive Belt | Cord flown out at 700 hours |

The foregoing disclosure of specific embodiments is intended to be illustrative of the broad concepts comprehended by the invention.

I claim:

1. A fiber cord for use in a power transmission belt, said fiber cord comprising:
    a plurality of fiber filaments twisted together in a first direction to produce strand yarns with a primary twist and a first twist coefficient; and
    a plurality of said strand yarns twisted together in a second twist direction opposite to said first twist direction to produce a fiber cord with a final twist and a second twist coefficient,
    wherein the second twist coefficient is between 4.0–7.0 and the ratio of the second twist coefficient to the first twist coefficient is at least 1.25.

2. The fiber cord according to claim 1 wherein the fiber filaments are aramid fiber filaments.

3. The fiber cord according to claim 1 wherein the fiber filaments are treated with an epoxy compound.

4. The fiber cord according to claim 1 wherein the fiber cord is treated with an RFL solution.

5. The fiber cord according to claim 1 wherein the total denier for the fiber cord is in the range of about 3,000–30,000 d.

6. The fiber cord according to claim 1 wherein the total denier for the fiber cord is approximately 18,000 d.

7. The fiber cord according to claim 1 wherein the fiber filaments have a denier of approximately 1,500 d.

8. The fiber cord according to claim 2 wherein there are at least three filaments in each strand yarn.

9. The fiber cord according to claim 8 wherein there are four strand yarns in said fiber cord.

10. The fiber cord according to claim 1 in combination with a belt body having a length, said fiber cord extending lengthwise of the belt body.

11. The fiber cord according to claim 10 wherein the belt body has oppositely facing side surfaces and the fiber cord is exposed at one of the side surfaces of the belt body.

12. The fiber cord according to claim 10 wherein the belt body and fiber cord define a cogged power transmission belt.

13. The fiber cord according to claim 10 wherein the fiber cord is embedded in a rubber layer that is at least one of natural rubber, styrene butadiene rubber, chloroprene rubber, and nitrile rubber.

14. The fiber cord according to claim 13 wherein there are short staple reinforcing fibers in the rubber layer, said reinforcing fibers being at least one of cotton, pulp, nylon, polyester, aramid, artificial silk, rayon and carbon fiber.

15. The fiber cord according to claim 14 wherein the reinforcing fibers are mixed in the rubber layer in a ratio of 1–25 weight parts of reinforcing fibers for each 100 weight parts of rubber.

16. The fiber cord according to claim 10 wherein there are a plurality of laterally extending cords embedded in the belt body, said laterally extending cords being made from at least one of polyester, aliphatic polyamide, aromatic polyamide, glass fiber, and carbon fiber.

17. The fiber cord according to claim 10 wherein the belt body has an inside surface and an outside surface and there is at least one layer of fabric on at least one of the inside and outside surfaces.

18. The fiber cord according to claim 12 wherein the cogged belt has a compression section defining longitudinally spaced cogs with valleys therebetween, there are a plurality of laterally extending cords in the compression section and the laterally extending cords are arranged in a wave-like pattern.

19. The fiber cord according to claim 18 wherein the belt body has an inside surface and an outside surface and the laterally extending cords are spaced from the inside of the fiber cord a distance that is in the range of 0.05 to 0.8 times the distance between the valley and the inside of the fiber cord.

20. The fiber cord according to claim 18 wherein there is a reinforcing rubber layer between the laterally extending cords and the fiber cords, said reinforcing rubber layer having a thickness in the range of 0.2 to 5.0 mm.

21. A fiber cord for use in a power transmission belt, said fiber cord comprising:
    a plurality of untwisted fiber filaments pretreated with an epoxy compound and twisted together in a first direction to produce strand yarns with a primary twist and a first twist coefficient; and
    a plurality of said strand yarns twisted together in a second twist direction opposite to said first twist direction to produce a fiber cord with a final twist and a second twist coefficient,
    said fiber cord being treated with an RFL solution,
    wherein the second twist coefficient is between 4.0–7.0 and the ratio of the second twist coefficient to the first twist coefficient is at least 1.25.

22. The fiber cord according to claim 21 wherein the fiber filaments are aramid fiber filaments.

23. The fiber cord according to claim 22 wherein the total denier for the fiber cord is in the range of about 3,000–30,000 d.

24. The fiber cord according to claim 23 in combination with an elongate power transmission belt body wherein said fiber cord extends lengthwise of said belt body to define a load-carrying element.

* * * * *